(12) United States Patent
Lobo et al.

(10) Patent No.: US 7,873,667 B2
(45) Date of Patent: Jan. 18, 2011

(54) SYSTEM AND METHOD FOR ELECTRONIC SUBMISSION, PROCUREMENT, AND ACCESS TO HIGHLY VARIED TEST DATA

(75) Inventors: Hubert Lobo, Ithaca, NY (US); Kurien Jacob, Ithaca, NY (US)

(73) Assignee: Matereality, LLC, Ithaca, NY (US)

(*) Notice: Subject to any disclaimer, the term of this patent is extended or adjusted under 35 U.S.C. 154(b) by 0 days.

(21) Appl. No.: 12/567,111

(22) Filed: Sep. 25, 2009

(65) Prior Publication Data

US 2010/0030784 A1 Feb. 4, 2010

Related U.S. Application Data

(63) Continuation of application No. 10/666,601, filed on Sep. 18, 2003, now Pat. No. 7,613,700.

(51) Int. Cl.
*G06F 7/00* (2006.01)
*G06F 17/30* (2006.01)

(52) U.S. Cl. ..................................... 707/793

(58) Field of Classification Search .......... 707/999.005, 707/999.009, 793
See application file for complete search history.

(56) References Cited

U.S. PATENT DOCUMENTS

| | | | |
|---|---|---|---|
| 6,105,027 A | 8/2000 | Schneider et al. | |
| 6,484,173 B1 | 11/2002 | O'Hare et al. | |
| 6,807,542 B2 | 10/2004 | Bantz et al. | |
| 2003/0069795 A1 | 4/2003 | Boyd et al. | |
| 2003/0217037 A1 | 11/2003 | Bicker et al. | |
| 2004/0117397 A1 | 6/2004 | Rappold, III | |
| 2004/0243580 A1 | 12/2004 | Markki et al. | |
| 2005/0131861 A1 | 6/2005 | Arritt et al. | |
| 2007/0288918 A1 | 12/2007 | Gouge et al. | |

OTHER PUBLICATIONS

E.F. Begley and C.P. Sturrock, The Background and Development of MatML, a Markup Language for Materials Property Data, pp. 1-8.
Cho, Jung Won. "Pulsed DC Reactive Magnetron Sputtering of Aluminum Nitride Thin Films" North Carolina State University: Aug. 27, 2002, pp. 1, 36, 151, and 153. http://www.lib.ncsu.edu/theses/available/etd-08/27/2002-151641/unrestricted/etd/pdf.

*Primary Examiner*—John R. Cottingham
*Assistant Examiner*—Kimberly Lovel
(74) *Attorney, Agent, or Firm*—Brown & Michaels, PC

(57) ABSTRACT

A method and data repository for the delivery, storage, maintenance and controlled access to test data, stored in a centrally administered data repository. The system allows entities to store individual collections of data which may be public or private in keeping with their business needs, while permitting them to have or obtain access to other data within the repository in which they might have an interest. Reflecting the natural flow of information, the system uses a data storage schema that permits the storage of a virtually unlimited variety of test results in a series of compact structures. To do so, the schema utilizes a series of metadata structures that describe collections of instance specific information.

30 Claims, 5 Drawing Sheets

SYSTEM AND METHOD FOR ELECTRONIC SUBMISSION, PROCUREMENT, AND ACCESS TO HIGHLY VARIED TEST DATA

REFERENCE TO RELATED APPLICATIONS

This is a continuation patent application of application Ser. No. 10/666,601, filed Sep. 18, 2003 now U.S. Pat. No. 7,613,700, entitled "SYSTEM AND METHOD FOR ELECTRONIC SUBMISSION, PROCUREMENT, AND ACCESS TO HIGHLY VARIED MATERIAL PROPERTY DATA". The aforementioned application(s) are hereby incorporated herein by reference.

BACKGROUND OF THE INVENTION

1. Field of the Invention

The present invention relates generally to databases and the electronic storage and retrieval of information related to samples and tests. In particular, the invention relates to the technology for efficient data delivery, collaborative publishing and sharing of data related to samples and tests while safeguarding the interests of the stakeholders of the data.

2. Description of Related Art

Many materials databases exist today to serve as a repository of particular kinds of properties, analogous to the way the Internet stores a wide variety of information. Because of the enormous variety of material data, the emphasis to date, of such databases has been to collect all available properties of the kind that they have been designed to accommodate and then serve it to the client base for the purpose of comparison between materials. Products such as Matweb, CAMPUS and IDES are examples of such technologies. The primary advantage of this approach is that there is a large repository to search from, aiding in material selection from a wide palette of possible choices. Unfortunately, a proliferation of such specialized databases exists, often with conflicting property data and having no means to perform streamlined searches to find appropriate and valid data. Further, such extended collections may still not contain the specific properties of interest to the user.

Many companies then try to develop their own means to collect only the properties they need on the materials that they have an interest in. However, this calls for internal databases which are costly to design and cumbersome to maintain. With properties that reflect the reality of the product behavior, the need for privacy is heightened so that such databases are usually private. A typical user now has to choose between an internal database and the multitude of external databases for his data. Maintaining such multiple data sources in the enterprise, besides adding cost and inefficiencies, results in the risk of inconsistent material property data usage in the product life cycle. Consequently, within the same product development group, different data may be used, compromising the robustness of the design. To further complicate the collaborative environment, material data is stored in proprietary formats understood only by the program responsible for rendering the data visually.

A non proprietary format in existence today is MATML (a derivative of the XML language, developed by the W3C Consortium). MATML is developed by the National Institute of Standards and Technology (NIST) and is touted as a standard with respect to representation of material data. However MATML does not satisfy all requirements for presenting the material data with regards to the context from which it originated.

There exist systems which are able to store and retrieve MATML documents. One example of such is CENTOR (Centor Software Corp., Irvine, Calif.) which is a system specialized purely to store XML documents efficiently. CENTOR is a generalized solution for storage and retrieval of XML documents which does not take into account the specialized requirements of collaborative publishing and sharing of material data.

For the greatest efficiency, data would need to be catalogued and stored effectively, with controlled access, for use by interested (and permitted) parties across different enterprises and geographic locations.

SUMMARY OF THE INVENTION

The system of the invention provides a method, preferably implemented in computer software, for the delivery, storage, maintenance and controlled access to test data, stored in a centrally administered data repository. The system allows entities to store individual collections of data which may be public or private in keeping with their business needs, while permitting them to have or obtain access to other data within the repository in which they might have an interest.

Reflecting the natural flow of information used in the preparation of a material property, the system uses a data storage schema that permits the storage of a virtually unlimited variety of material properties in a series of compact structures. To do so, the schema utilizes a series of metadata structures that describe collections of instance specific information.

Data representing different facets of a specimen sample of the material, would be grouped as a 'dataset'. Each sample dataset that is stored in the repository would be labeled as being owned by a specific user (hereafter termed as the dataset owner). Each dataset that is stored in the repository would contain information allowing for traceability of the origins of the dataset from the point of measurement. The traceability information includes but is not limited to the source of sample(s) upon which the property measurement was conducted, raw data from which the results were derived, test parameters including the test methods used and the date of measurement, information about the entities performing and validating the measurement and any premises or assumptions upon which the results are based.

The repository also consists of characterizing data such as classification data, sourcing data, and compositional data.

The system would allow a controlled set of users to contribute and retrieve data relating to properties of various samples from the repository. The system allows the ability to define policies for access to each property dataset by the dataset owner. For example, the system allows a dataset owner to label a property dataset that they own as 'private'. No other user is permitted access to any data that is part of the dataset. The system provides the ability for a user to request a dataset owner for access to private datasets. The system allows a dataset owner to sell access to the dataset.

The system provides the ability for Users to request a review of data in the repository. Such a review would be conducted by the authoritative source from where the data originated.

All transactions are preferably logged in order to maintain records of activity.

In a preferred embodiment the system would support the notion of groups of users, with each group representing a single domain of authority, usually a company or a division of the company. Each group would preferably have a representative authoritative user who would set the policies for the entire group. Such an authority would be allowed to control group membership and data sharing policies for all the members of the group. A hierarchical chain of command is possible.

The system preferably provides a personalized user interface. The current preferred embodiment of the system uses the World Wide Web to access and publish data.

DETAILED DESCRIPTION OF THE INVENTION

Figure 1:
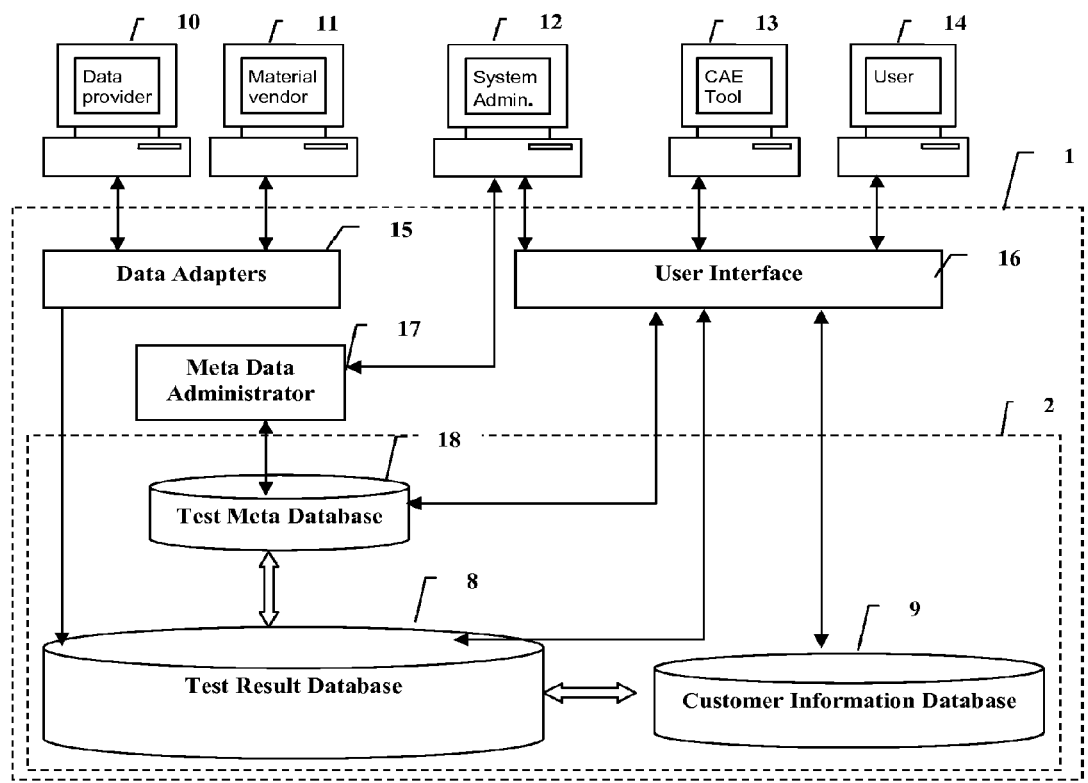
FIG. 1 is a diagram of the components of the invention, their interactions and relationships.
Figure 2:
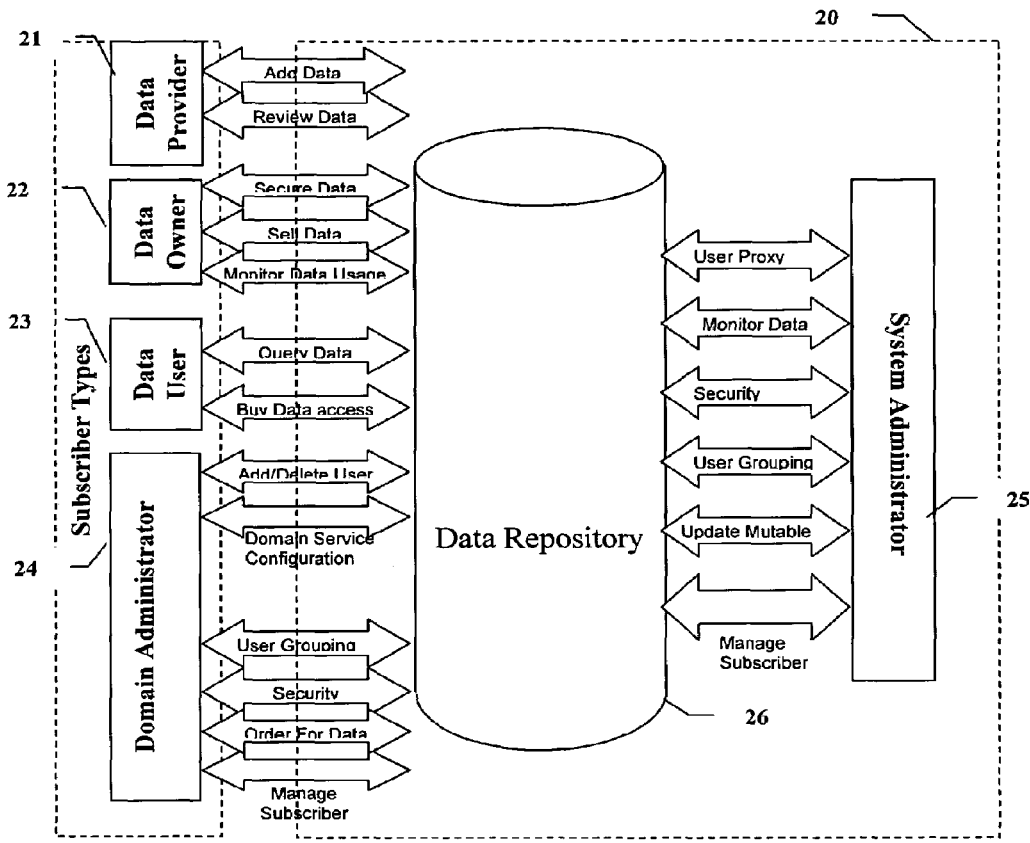
FIG. 2 is a block diagram showing the interaction of users with the system of the invention.

In the business of testing, diverse properties are measured that describe the physical, chemical, electrical or other characteristics of a wide array of materials: metals, plastics, foams, rubber, composites to name a few. Such information is widely used in almost every kind of industrial and research activity. Information is generated in testing laboratories for clients who may be vendors or end users of the samples, The present invention provides the means for the development of a secure, web-based globally accessible data management solution which permits clients to access, organize and share traceable properties using a system that easily adapts to suit their business model. The ability exists to share information securely across a network of collaborating enterprises, with access controlled by the data owner. Such a system allows interoperability, ease of access and global collaboration without compromising security and is described below:

FIG. 1 describes the architecture of the system (1). The participants in the system processes are the material vendor (11), the test data provider (10) which is typically a test laboratory, the system administrator (12), the data owner (14) and various analytic software (13) and users (14) of the system who wish to access data. Outlined in FIG. 1 are the main processes of the system and the mechanisms to support such processes. These processes are detailed below. Different kinds of users may have varied interactions with the system (20), as shown in FIG. 2. Data providers, typically test laboratories (21) contribute property datasets to the repository. They have the ability to add and review property datasets. Data providers may transfer ownership of property datasets to data owners (22), typically, their client. Data users (23) retrieve property datasets relating to properties of various samples from the repository (26). The system allows data owners to define policies for access to each property dataset (22). For example, the system allows a data owner to label a property dataset that they own as 'private'. No other data user is permitted access to any data that is part of the dataset. The system (20) provides the ability for a data user to request a data owner for access to private datasets. The system (20) allows a data owner to sell access to the dataset. The system (20) allows a data owner to monitor the usage of their datasets.

The system (20) supports the notion of groups of users, with each group representing a single domain of authority, usually a company or a division of the company. Each group would have a representative domain administrator (24) who would set the policies for the entire group. Such an authority would be allowed to control group membership and data sharing policies for all the members of the group. A hierarchical chain of command is possible.

The system (20) exercises administrative control over the repository (26) with functionality to act for users, monitor data, update mutable data, create and manage subscribers and groups.

Data Collation

Data is collected in a controlled manner by the system (1). This is achieved by giving a controlled set of users the capability to add data to the system. Such users typically are the sample owners or vendors and data providers (10), typically test laboratories.

In one embodiment the vendor is provided a Web form in which the attributes for the material are filled in. Upon completion of filling the form the data is entered into the repository (2) via data adapters (15) which perform preliminary validation checks as to whether the information for the material already exists. Each sample is uniquely named and the name is very often the prerogative of the vendor.

The data provider (10) is allowed to submit datasets that have been obtained from testing specimen samples of the material. In one embodiment the data provider is allowed to submit XML documents, each of which represent the results of the measurements, using a form across a computer network, such as a Web form. Alternatively the data provider can have a computer program submit an XML document using the SOAP protocol as defined by the W3C. Upon submission of the document the data is entered into the repository (2) via data adapters (15) which perform preliminary validation checks regarding the structure of the data described by the document.

Data Schema

Figure 3:
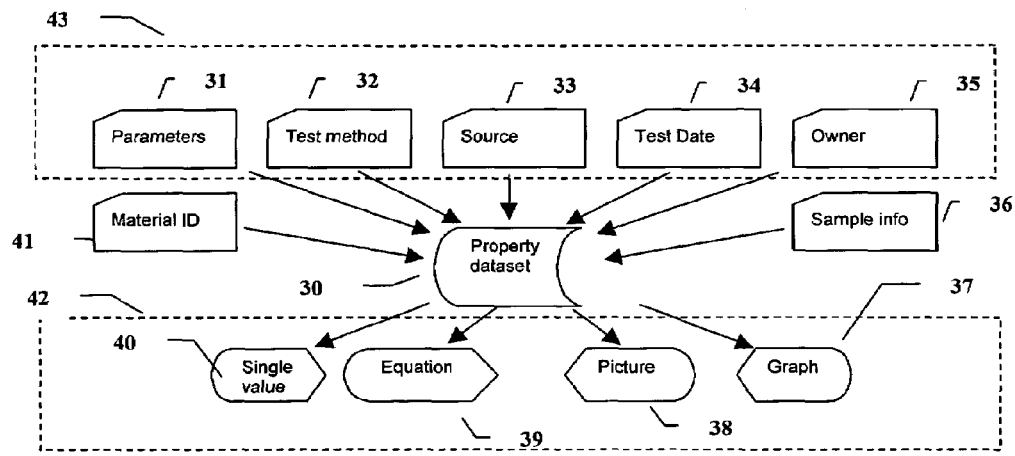
FIG. 3 presents a visualization of a property dataset. Typical attributes of the dataset are illustrated.

Referring to FIG. 3, property datasets (30) are collections of information (43) or data elements, and one or more results (42) that are derived from the performance of a test on a sample. A sample is defined as a specific instance of a given material. The information (43) about the sample (36) used in the measurement of a property form a part of the property dataset. The results (42) may be in different forms ranging from single point data (40) to data arrays and graphs (37) capturing the dependencies of the property with respect to different parameters. Results may also comprise equation coefficients (39) as would be obtained when arrays of data are fit to various mathematical equations. Results may also be pictures (38) such as would be obtained from microscopic analysis. Parameters (31) define the variables that are reported in the context of a property measurement.

In addition to the basic property data, the context of the property measurement is also captured. Thus there are attributes capturing information about the source of the data (33), the method (32) used in the tests and the test process traceability (34, 35) details. The types of properties that must be accommodated by the system are open-ended. The system's data repository is thus required to provide an efficient mechanism for the storage and retrieval of complex material data where the type and shape of property data is continuously evolving. In addition the storage mechanism should be able to efficiently extract all information of a dataset, preferably in XML form.

A possible approach would be to let each property dataset be fully self describing, that is, contain all information required to describe themselves to any generic viewing or data formatting tool. However since the results for each dataset may be intrinsically large in nature, such as pictures, the storage cost of such an approach is unaffordable. Further, lack of commonality of attribute descriptors would inhibit search and selection. Hence one embodiment of the repository separates out information, labeled as property metadata, which describes a dataset for purposes of presentation and formatting, from intrinsic property result information, which is labeled as property instance data and stored in the test result database (8). The form and structure of the submitted property instance data is enforced by the property metadata which is stored in the test meta database (18).

Property metadata is used to capture the presentation information and common test information. The test metadata includes the data such as the test method and type, test material characterization information and where necessary, the testing process description. In addition, the test metadata includes the description of test output data components. Thus both point data and the graphs captured in the output data are described. Each data component description includes the component's name/title, type (point/coefficient/graph) and the field descriptions for that component. Each field description includes the field name, the field's data type, acceptable value sets (ranges, enumerations), default values and the name of the field's physical unit (kg, in, J, etc).

Table 1, following, shows an example of a dataset for a test of a sample of a plastic material. As can be seen in the table, the dataset, titled "Thermal Conductivity" contains Owner Information, Material Information, Sample Information, Test Information and one or more Results. Each type of information is made up of one or more data elements, stored in the form of metadata (a field identifying what sort of data is stored, such as "temperature") and instances (the stored data itself, say the value "200"). The instances may also include a description including a data type ("integer"), acceptable value sets (ranges, enumerations), default values and the name of the field's physical unit ("° C."). Optionally, the instance might include a default value or other information. The metadata may be further conceptually grouped by type, as shown in the table, where the "Test Information" metadata is grouped into parameters, methods and source. The number of metadata elements in any dataset is variable, and the number and type of metadata will vary from dataset to dataset. This provides great flexibility.

TABLE 1

Example of a Dataset Showing Metadata and Instances

| Information Type | Metadata Type | Metadata (field name) | Instance Value | Description |
|---|---|---|---|---|
| | Property Dataset | Thermal Conductivity | None | |
| Owner Information | Owner | Name | Joe Smith | alphanumeric |
| | | Company | ABC Industries | alphanumeric |
| Material Information | Material ID | Material Name | XYZ PP-2345 | alphanumeric |
| | | Material Class | Plastic | alphanumeric |
| | | Material Sub-class | PP | alphanumeric |
| | | Material Supplier | XYZ Polymers | alphanumeric |
| Sample Information | Sample Type | Type | Pellets | alphanumeric |
| | Sample ID | ID | 1234-4556 | alphanumeric |
| Test Information | Method | Test Method | ASTM D5930 | alphanumeric |
| | | Standard Body | ASTM | alphanumeric |
| | Parameters | Temperature | 200 | integer, ° C. |
| | | Voltage | 2.5 | floating, Volts |
| | | Drying | None | alphanumeric |
| | Source | Test Lab | HIJ Laboratories | alphanumeric |
| | | Test Date | Jun. 6, 1999 | date |
| | | Accreditation | ISO 9000 | alphanumeric |
| Results | Result 1 | Conductivity | 0.2 | Single Point, W/m · ° K |
| | Result 2 | Graph points | 200, 0.2 190, 0.198 170, 0.195 150, 0.192 . . . | Graph |
| | Result 3 | Equation coefficients | 3.1, 0.44, −1.6 | floating array |
| | Result 4 | Picture | DSC0123.JPG | Picture file |

The test metadata shares the lifecycle of the material properties that refer to it. In order to accommodate continuous growth in the type of properties stored, administrative capability exists to create and edit metadata. The repository maintains relations between stored property and the metadata that describes it. Intrinsic property result information also includes data such as test instance identification, instruments used, time and period of test, data ownership information, data access information and reliability information. Sample information includes sample characterization information, manufacturing and post processing information. Test specific component information, as described by the metadata, is maintained. All test data would identify the test type as specified by the test metadata. The volume of data output through the testing process is large. A typical type of test data is in the form of data arrays plus diverse types of derived test results. With this approach, the linkage between different property results emanating from a single property measurement is maintained.

Further, the material data reporting requirements of test measurements standards organizations such as ISO and ASTM can be are satisfied.

Scalability of types of content is achieved by augmenting the metadata (17) to describe additional types of intrinsic property result information. Conversely, the metadata restricts the type of intrinsic property result information that can be submitted to the repository. Transactions involving additions and changes to the metadata are preferably recorded by the system for future traceability.

The repository is preferably implemented using an RDBMS and the schema allows for efficient querying of individual property values thus aiding in data mining and analysis.

Thus the user can selectively query the graph data (e.g. requesting a plot of a subset of the parameters). If the data is always indivisibly exposed as a single object such as a picture, then the data is stored as a single large object, which modern database packages can efficiently support.

The use of the Internet provides for an efficient implementation of the collaborative aspect of the system. In this manner, complete and efficient systems can be built that house large collections of complex material data that can be shared securely in keeping with the needs of the business enterprise.

Data Ownership and Access

Material property data, as maintained by the system, always has an owner (35)—a specific system user. In one embodiment the data owner initially is the authorized test data provider (10) who may then choose to transfer the ownership to another party who has requested for such tests.

A current owner should be able to transfer ownership of the data to another valid system user. In one embodiment, a Web form is provided to the owner of the data who specifies the name of a system user. Upon submission of the form, ownership for the data is irreversibly transferred to the new owner. The form presents the owner with the options of transferring ownership of data at different granularities such as property datasets from a single test or a collection of property datasets derived from a sample or a batch of samples related to a particular piece of work etc. The new owner is preferably notified about the ownership change.

The repository maintains attributes of data ownership for each property dataset.

A data owner can control the access to their data. Access to property data is categorized as public or restricted. Further there is an option of announcing the availability of the dataset. In one embodiment, a Web form is presented to the user which offers the option of setting the access. The form offers control of access at various granularities such as access to results from a single property dataset or a collection of property datasets derived from a sample or a collection of samples. Further in the case of restricted access, the owner can specify a list of users who may be granted access.

The repository maintains attributes of data access for each property dataset.

The system provides a means to record transactions performed on a property dataset. In one embodiment, the data owner can view logs that track information such as access to the dataset by users, changes to ownership and review requests. Information presented would include but not be limited to transaction date, transaction type and user performing the transaction.

Data Searching and Viewing

A user of the system can locate material data in a variety of ways.

Figure 4:
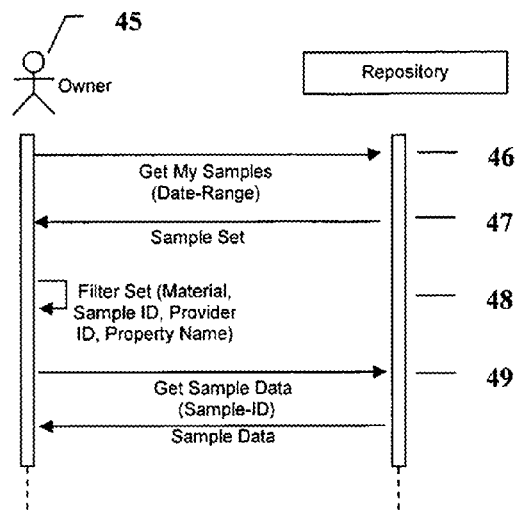
FIG. 4 shows how a data owner may query the repository for information

The first way (FIG. 4) presents data owners (45) with a list summarizing the data that they own. Each item in the list possesses sufficient information for the owner to identify the property. In one embodiment, the data owner requests (46) and is presented (47) with the name of the material, the name of the property, the date of measurement, identification of the specimen sample as obtained from the data provider and an identification of the test as obtained from the data provider. The data owner is presented with a hyperlink which would lead to the display of an overview of all results of the test (49). The data owner is also allowed to narrow down the list (48) to data which represent the same test or property data for the same sample.

Figure 5:
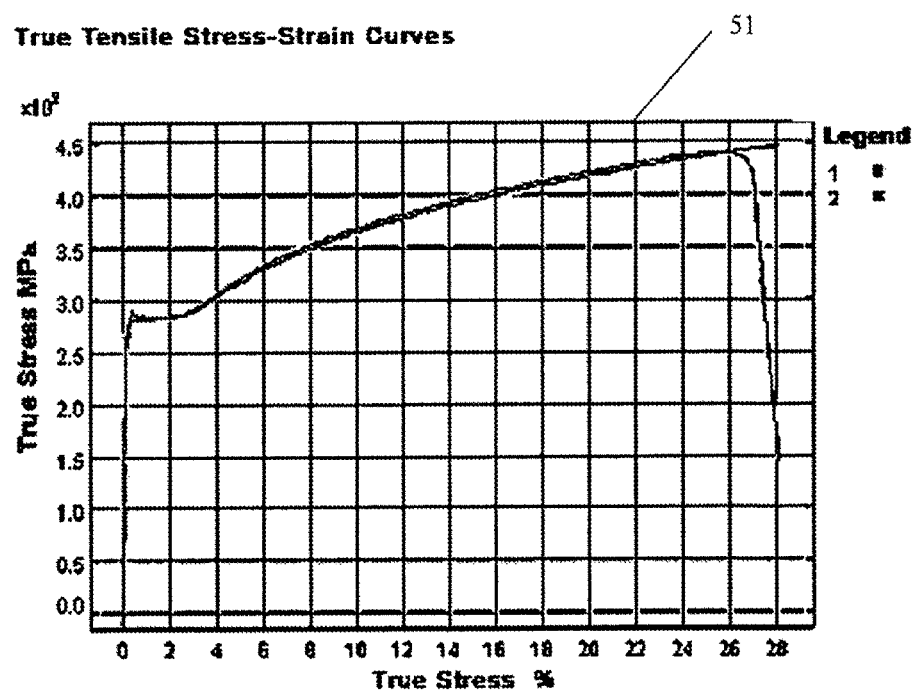
FIG. 5 illustrates a typical output of such a system; the ability to present data in graphical form

Within the summary of results for a test, each result is identified by its name (50) along with the parameters that define the result. Results which share defining parameters are grouped visually to permit the user to examine dependencies of the properties on the parameters. In one embodiment each such group presents a hyperlink which would lead to a more detailed presentation of the results for that group. Such a detailed presentation (FIG. 5) involves a visual rendering of Graphs, (51) equations that describe the data, multi-dimensional tables and pictures.

One embodiment provides for the ability to zoom in or zoom out on sections of a graph (51).

Figure 6:
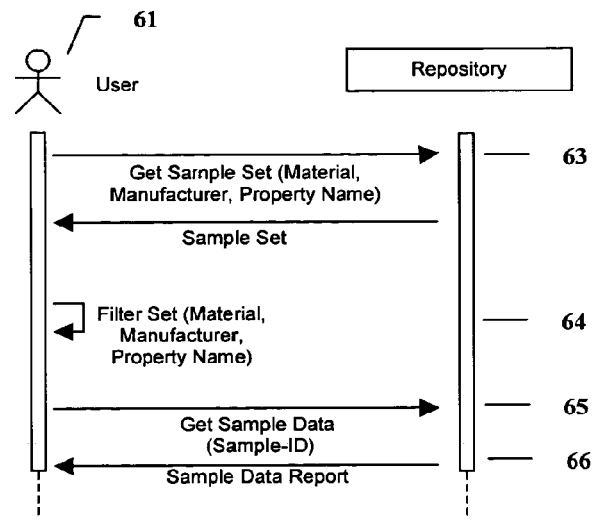
FIG. 6 presents a flowchart demonstrating how a search engine extracts relevant data from the repository
Figure 7:
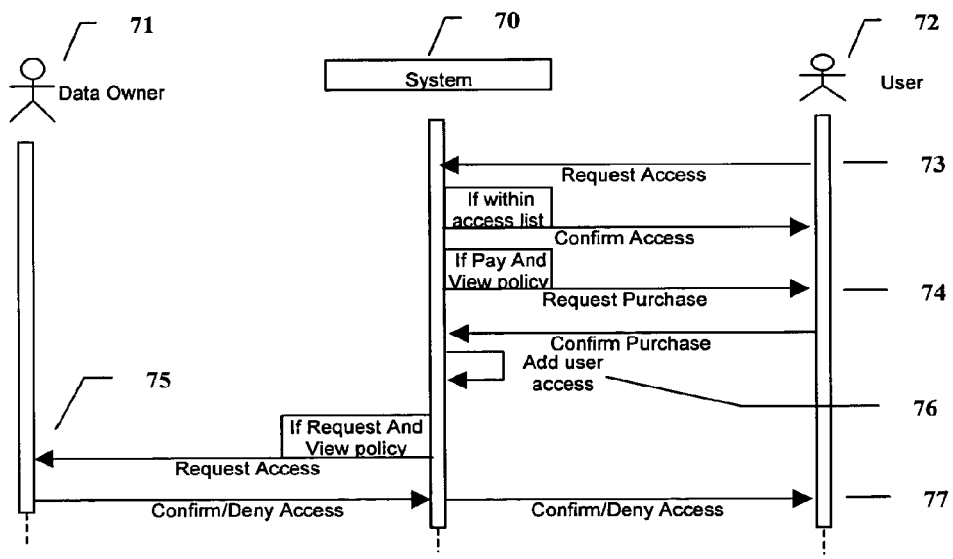
FIG. 7 shows how users may request access or purchase access to datasets from a data owner

The second approach (FIGS. 6 and 7) consists of allowing the user (61) to drill down to locate the desired data using a guided approach whereby the user is able to specify their requirements for desired data. Such requirements include the class or subclass of material, the material supplier, the property name, the material name and constraints on values of the property.

One embodiment implements navigation through sequences of web forms allowing the user to specify restrictions on property data, thus eliminating undesirable datasets and increasing efficiency.

The first search sequence involves three Web forms. The first form (63) allows the user to indicate any requirements on the class, subclasses or suppliers of material. The second form (64) allows the user to indicate the properties sought. The third form (65) presents the set of materials with their properties and allows the user to focus on the material and property of choice. Upon submission of the third form a summary of the set of datasets for the specified material and property are displayed (66). The user now can browse the specified datasets and their property result values as outlined in the first approach.

At this point if the user (72) does not have sufficient access privileges for their data, they are automatically presented with a form which allows them to request for access (73) to the data. The data owner (71) would be notified about such requests (75) along with basic identification and contact information about the requesting user. The system (70) provides the data owner with a Web form containing a list of such requests, each identifying the dataset and the requesting user. Alongside each request for access are options to accept or reject the request (74). Upon submission of the form, the access profile for datasets, whose access requests have been accepted, is updated to include the requesting users (76). All requesting users are notified of the data owner's action (77), whatever it may be.

Figure 8:
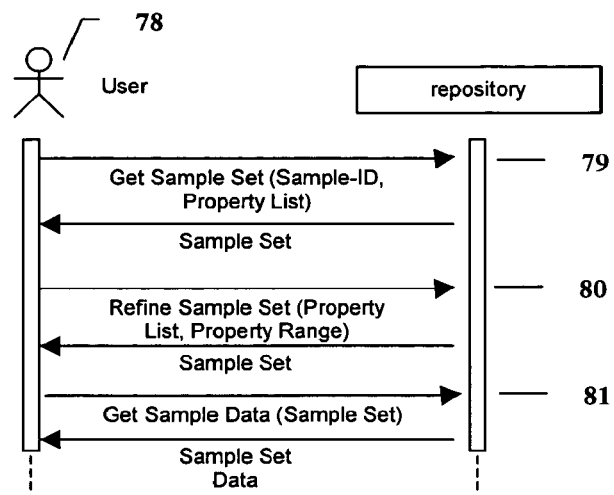
FIG. 8 presents an alternate scheme for searches of data from the repository with the application of property constraints.

A second search sequence (FIG. 8) involves the user (78) specifying property value ranges. Here, the first form is similar to the first search sequence (79) and allows the user to indicate classes and/or subclasses of materials. The second form (80) allows the user to indicate a set of properties with restrictions on the values of the results for each property. The third form (81) would allow the user to select from materials and properties all of whom conform to the previous restrictions. Upon submission of the third form a summary of the property datasets is presented as in the first search sequence.

The third approach for retrieving data is targeted at the requirements of analytical software packages. Here the data is required to be output in a format which is understandable by other software packages. The current portable data format of choice is XML. In a particular embodiment, MatML is a specialized format for specifying material property information. For the purposes of machine data interchange, MatML has been found to be sufficiently expressive and is used as by the system to export its data to other software packages. In a proposed embodiment the system will have two interfaces for exporting the data to other packages. The first interface would consist of an option, along with the summary and detailed views of a dataset, to export the data. The option would be implemented as a hyperlink or button. Upon selecting the option, XML data for the dataset would be generated in a format that conforms to the specifications of MatML.

Figure 9:
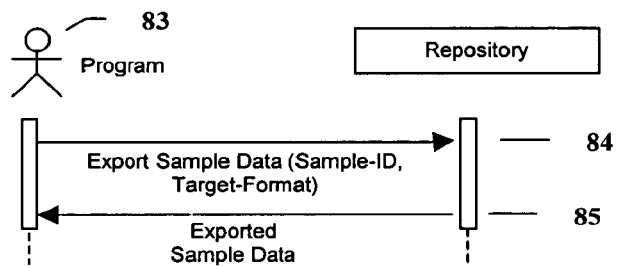
FIG. 9 is a flowchart that illustrates how third party applications may request access to a dataset from the system

The second interface (FIG. 9) would be provided as computer programs to complement popular analytic software packages (83). The program would obtain the requirements of the data based on the current context of operation of the analytic package. The program (83) would then connect to the system over the World Wide Web and request for the desired data in MATML or other format (84). The data would then be presented to the analytic software package (85).

Data Administration

Figure 10:
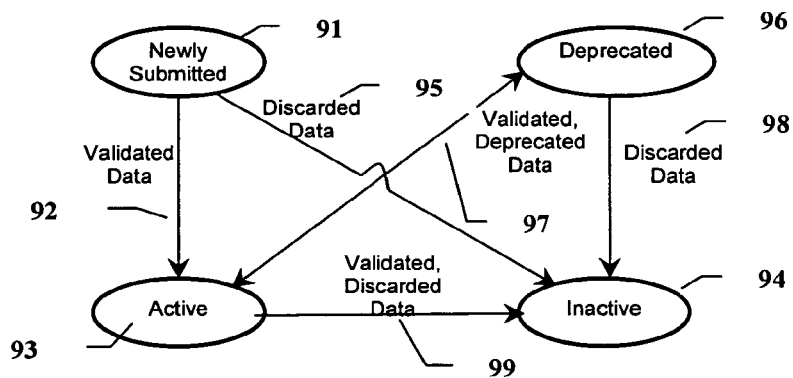
FIG. 10 is a state diagram showing transitions for data within the system of the invention.

FIG. 10 illustrates the life cycle of material data within the system and the interaction between various interested parties in the management of its life cycle. Material property data goes through the lifecycle documented by the state diagram in FIG. 10.

The system cycle starts (91) when a property dataset is submitted by the data provider. The system will then acknowledge the submission. The data provider validates the dataset (92) and transfers ownership of the dataset to the data owner, upon which the dataset is labeled as being in an active state (93). Otherwise the provider could choose to discard the dataset (95), in which case the dataset is labeled as being in an inactive state (94) and comes under the purview of the system administration.

While the data is in an active state (93), any user of the system can request for review of the data by the provider, if there is reason to suspect the validity of the data. In other cases the provider may initiate the review of the data. In either case the data will fall into a deprecated state (96). Upon completion of the review the data returns to being active (93). A consequence of such a review is that data may be discarded (98). The data owner has the option of discarding their data (99) at any point. Upon such an action the data will fall into an inactive state (94). While the system administrator has access to all data, datasets that are newly submitted or data that is in an inactive state are not visible to users. The prerogative for purging inactive data falls upon the system administration. The repository maintains attributes tracking the state of each dataset throughout its lifetime (9).

In one embodiment, the data provider (21) is allowed to view all data that has been submitted by the provider (21). The data at this stage is owned by the provider (21). The data provider browses the data they own, as outlined earlier. While viewing the list of datasets, the provider is provided with the option of withdrawing each dataset. This is implemented by providing a checkbox alongside the summary line for each dataset, which, when clicked, updates the state of the dataset as inactive and under the purview of the system administration (25).

While browsing data using any of the methods specified earlier, the user is presented with an option to request a review of data. One embodiment implements a Web form which allows the user to specify that a review (97) has been requested along with essential information about the party requesting the review. Upon submission of the form the provider of the data is notified about such requests. The provider of the data may or may opt not to review the data. The provider is presented with a Web form outlining all review requests directed at the provider. The provider is allowed to select the requests to be reviewed and those requests which are rejected. Upon submission of the form all datasets which the provider has agreed to review are tagged as under review (96) and maintained as such within the repository. All other datasets remain tagged as active (93). The requesting user is preferably notified about the undertaken action. Upon completion of review, the provider is allowed to re-activate the data (97). One embodiment provides a Web form to be used by the provider to browse the data that is under review. The form lists the datasets that are under review and allows the provider to select the data to be re-activated and data that is to be deprecated. Deprecated data (96) continues to be visible but is explicitly labeled as such. The data owner will have the prerogative to relinquish ownership of such data.

One embodiment of the system allows the data owner to discard their datasets (99). This option is provided in a similar manner to those for transferring ownership or updating the access profile. Thus the data owner can choose to discard all datasets for a test, datasets for a specimen sample or a single dataset.

Preferably, the system provides a means to record transactions performed on a property dataset. Thus, all changes to the state of a dataset can be recorded.

User Management

The system interacts with a controlled user set. The administration is allowed to add, delete or suspend users. In addition the preferred embodiment of the system allows for a hierarchical user set. Thus there is the notion of domains of users. Each domain has a controlling or administrative user (24) who is responsible for controlling the user profile for the domain. The system recognizes the special roles of data provider (21) and system administrator (25) each of which is a stakeholder in data that they may not own. Users who do not fall under the control of a domain administrator fall under the purview of the system administrator. Preferably all administrative transactions are logged. The log can contain information about the activity, the time of the activity and the related parties.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer-implemented system for delivery, storage and maintenance of test data, said data comprising a plurality of test datasets each dataset being associated with a sample and a test on the sample, the system comprising:
   a) a programmed computer;
   b) a data repository for storage of the plurality of datasets, coupled to the computer, comprising
      i) a metadata database in the form of instances with associated metadata giving information about the instances, the metadata comprising at least one data element selected from a list comprising name, description, and identifying information, the metadata database comprising:
         A) metadata on the sample;
         B) metadata on the test; and
         C) metadata on data value elements in a test result database further comprising at least one data element selected from a list comprising data type, units, acceptable values or ranges, and default value; and
         D) metadata on the metadata, comprising at least one data element describing the metadata on the sample, test and data value elements in the metadata database;
      ii) a test result database comprising a plurality of instances having associated metadata in the metadata database giving information about the instance, the instances comprising information about at least one result derived from the test on the sample, each instance comprising:
         A) at least one data element representing information about at least one of the sample or the test; and
         B) at least one data value element representing a test result, selected from a list comprising a single data point, an equation, a graph, a data array, a data file and a picture;
   wherein the metadata in the metadata database define the instances in the metadata database and the instances of test result information in the test result database, and
   wherein an instance from the test result database, combined with its associated metadata from the metadata database describes the test result derived from the test on the sample and
   wherein the computer further comprises software encoding a method for receiving test data from users, storage and maintenance of the test data in the datasets in the data repository, and delivery of data from the repository to users.

2. The system of claim 1, in which the metadata on metadata on the sample of claim 1(b)(i)(D) comprises at least one data element selected from a list comprising a sample identification, classification, compositional and physical attributes, defining details, a sample description, a sample source and a sample type.

3. The system of claim 1, in which the metadata on metadata on the test of claim 1(b)(i)(D) comprises at least one data element selected from a list comprising a description of test method, test parameters, and test source information.

4. The system of claim 1, in which results that share common defining parameters are grouped to display the effect of the defining parameters on the result.

5. The system of claim 1, further comprising a customer database, comprising information about users of the repository.

6. The system of claim 5, in which the users about whom information is stored in the customer database comprise owners, users and providers of test datasets in the repository.

7. A method of managing test data comprising the steps of:
   a) storing test data in a repository stored in a computer memory comprising a plurality of test datasets, each dataset:
      i) being created by a data provider;
      ii) having at least one owner;
      iii) being associated with a sample and a test on the sample; and
   wherein the repository comprises:
      iv) a metadata database in the form of instances with associated metadata giving information about the instances, the metadata comprising at least one data element selected from a list comprising name, description, and identifying information, the metadata database comprising:
         A) metadata on the sample;
         B) metadata on the test; and
         C) metadata on data value elements in a test result database further comprising at least one data element selected from a list comprising data type, units, acceptable values or ranges, and default value; and
         D) metadata on the metadata, comprising at least one data element describing the metadata on the sample, test and data value elements in the metadata database;
      v) a test result database comprising a plurality of instances having associated metadata in the metadata database giving information about the instance, the instances comprising information about at least one result derived from the test on the sample, each instance comprising:
         A) at least one data element representing information about at least one of the sample or the test; and
         B) at least one data value element representing a test result, selected from a list comprising a single data point, an equation, a graph, a data array, a data file and a picture;
   wherein the metadata in the metadata database define the instances in the metadata database and the instances of test result information in the test result database, and
   wherein an instance from the test result database, combined with its associated metadata from the metadata database describes the test result derived from the test on the sample and
   b) providing at least one data owner with access to at least one dataset in the repository;
   c) providing at least one data user with access to at least one dataset in the repository; and
   d) displaying information from at least one dataset stored in step (a) and accessed by the user in step (c) on a display.

8. The method of claim 7, in which the test datasets are created by the data provider by the steps of:
   specifying generic information about the sample including at least one of a class, subclass, terms that are commonly associated with the sample, notes about the sample, generic physical attributes, components and their relationship within the sample;
   performing preliminary validation checks as to whether the information for the sample already exists;

performing preliminary validation checks regarding structure of the data; when the dataset passes the checks, entering the dataset into the repository.

9. The method of claim 8, in which the data provider specifies the dataset by submitting datasets, each of which represent the results of measurements.

10. The method of claim 9, in which the datasets are submitted interactively using a form over a computer network.

11. The method of claim 9, in which the datasets are submitted from a computer program.

12. The method of claim 11, in which the datasets are submitted by the computer program using Simple Object Access Protocol (SOAP).

13. The method of claim 7, in which the information on the sample in at least one dataset further comprises a nomenclature, and the dataset further comprises an identification of the sample owner, the method further comprising the step of providing the sample owner with access to the dataset for maintenance of the nomenclature.

14. The method of claim 13, in which the nomenclature is selected from a list comprising classification and general physical attributes.

15. The method of claim 7, in which the step of providing the data owner with access to at least one dataset in the repository comprises the steps of:
presenting the data owners with a list summarizing the data that they own, each item in the list possessing sufficient information for the owner to identify the test, the information being at least one of the name of the sample, the name of the test, a date of measurement, identification of a specimen sample as obtained from the test data provider and an identification of the test as obtained from the test data provider; and
presenting the owner with a hyperlink which would lead to the display of an overview and details of all results of the test.

16. The method of claim 15, further comprising the step of allowing the owner to narrow down the list to data which represent a same test or data for a same sample.

17. The method of claim 7, in which the step of providing the data user with access to at least one dataset in the repository comprises the steps of:
allowing the user to indicate any requirements on classification of subject;
allowing the user to indicate tests sought;
presenting a set of samples with their tests;
allowing the user to select at least one sample and test from the set; and
displaying a summary and details of a set of datasets for the specified sample and test.

18. The method of claim 7, in which at least some of the datasets in the repository further comprise data representing permitted user access privileges, and the step of providing a user with access to the repository comprises the step of comparing the user's access privileges to the data representing permitted user access privileges, and denying access to a dataset if the user's access privileges are not sufficient to access the dataset.

19. The method of claim 18, further comprising the steps, after the step of denying access, of:
presenting the user with a form to request access to the dataset;
accepting the form from the user;

notifying the data owner of the request for access, along with basic identification and contact information about the requesting user;
allowing the data owner to accept or reject the request;
if the data owner accepts the request, updating the data access privileges in the dataset to permit access by the user.

20. The method of claim 7, in which the step of providing the data user with access to at least one dataset in the repository comprises the steps of:
allowing the user to indicate any requirements on classification of a sample;
allowing the user to indicate restrictions on values of test results;
presenting a set of samples with their tests which conform to the restrictions;
allowing the user to select at least one sample and test from the set; and
displaying a summary and details of a set of datasets for the specified sample and test.

21. The method of claim 7, in which the step of providing the data user with access comprises the step of providing data in a format which is understandable by a selected computer program or application.

22. The method of claim 21, in which the repository further stores information describing the format which is understandable by a selected computer program or application.

23. The method of claim 7, in which there are a plurality of data users and a plurality of domains, and at least one domain administrator associated with at least one domain, and the method further comprises the steps of:
the domain administrator assigning at least some of the plurality of users to at least one domain, and
the domain administrator setting policies for access of at least one dataset by the users assigned to the domain.

24. The method of claim 23, in which the domains are a company or a division of the company.

25. The method of claim 23, further comprising the step of permitting the domain administrator to assign at least one domain to at least one other domain.

26. The method of claim 7, in which a data life cycle of at least one dataset is controlled by the step of permitting at least one user to activate, inactivate, deprecate and discard the dataset.

27. The method of claim 26, further comprising the step of providing any user with the ability to request the review of any active dataset.

28. The method of claim 7, in which the metadata on metadata on the sample of claim 7(a)(iv)(D) comprises at least one data element selected from a list comprising a sample identification, classification, compositional and physical attributes, defining details, a sample description, a sample source and a sample type.

29. The method of claim 7, in which the metadata on metadata on the test of claim 7(a)(iv)(D) comprises at least one data element selected from a list comprising a description of test method, a standards body specifying the test, test parameters, and test source information.

30. The method of claim 7, further comprising the step of providing at least one data owner with means to monitor usage of at least one dataset.

* * * * *